(12) United States Patent
Drumm et al.

(10) Patent No.: US 11,256,796 B2
(45) Date of Patent: Feb. 22, 2022

(54) ENSURING AUTHENTICITY OF AT LEAST ONE VALUE OF A DEVICE PROPERTY

(71) Applicant: SIEMENS AKTIENGESELLSCHAFT, Munich (DE)

(72) Inventors: Oliver Drumm, Eggenstein-Leopoldshafen (DE); Anna Palmin, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 176 days.

(21) Appl. No.: 16/603,219

(22) PCT Filed: Mar. 28, 2018

(86) PCT No.: PCT/EP2018/057942
§ 371 (c)(1),
(2) Date: Oct. 4, 2019

(87) PCT Pub. No.: WO2018/184945
PCT Pub. Date: Oct. 11, 2018

(65) Prior Publication Data
US 2020/0380111 A1 Dec. 3, 2020

(30) Foreign Application Priority Data
Apr. 5, 2017 (EP) .................................... 17165031

(51) Int. Cl.
*G06F 21/44* (2013.01)
*H04L 9/08* (2006.01)
*H04L 9/32* (2006.01)

(52) U.S. Cl.
CPC ............ *G06F 21/44* (2013.01); *H04L 9/0819* (2013.01); *H04L 9/3247* (2013.01); *H04L 9/3263* (2013.01)

(58) Field of Classification Search
None
See application file for complete search history.

(56) References Cited

U.S. PATENT DOCUMENTS

| 5,136,643 A | * | 8/1992 | Fischer | ..................... G07F 7/08 380/30 |
| 2006/0156011 A1 | | 7/2006 | Masui | |

(Continued)

FOREIGN PATENT DOCUMENTS

| CN | 1805440 A | 7/2006 |
| CN | 106156635 A | 11/2016 |
| DE | 202016105474 U1 | 11/2016 |

OTHER PUBLICATIONS

Communication of the Transmission of the International Provisional Report on Patentability for corresponding PCT/EP2018/057942 dated Mar. 7, 2019.

(Continued)

*Primary Examiner* — Brandon S Hoffman
(74) *Attorney, Agent, or Firm* — Lempia Summerfield Katz LLC

(57) ABSTRACT

The invention relates to a method for ensuring the authenticity of at least one value of a device property wherein the device property is a characteristic of a device (6). According to the invention, at least one operating value (14, 16) of at least one dynamic device property is signed using a digital key (20), wherein an operating-dependent digital signature (2) is generated.

12 Claims, 1 Drawing Sheet

(56) References Cited

U.S. PATENT DOCUMENTS

2008/0301445 A1* 12/2008 Vasic .................. G06F 21/6245
713/171
2016/0191473 A1 6/2016 De Wasch

OTHER PUBLICATIONS

European Search Report for European Patent Application No. 17165031.0-1870 dated Oct. 10, 2017.
PCT International Search Report and Written Opinion of International Searching Authority dated May 14, 2018 corresponding to PCT International Application No. PCT/EP2018/057942 filed Mar. 28, 2018.
International Preliminary Report on Patentability corresponding to PCT International Application No. PCT/EP2018/057942 dated Mar. 7, 2019.
Chinese Office Action for Chinese Application No. 2018800238590 dated Jul. 28, 2020, with English translation.

* cited by examiner

ENSURING AUTHENTICITY OF AT LEAST ONE VALUE OF A DEVICE PROPERTY

This application is the National Stage of International Application No. PCT/EP2018/057942, filed Mar. 28, 2018, which claims the benefit of European Patent Application No. EP 17165031.0, filed Apr. 5, 2017. The entire contents of these documents are hereby incorporated herein by reference.

BACKGROUND

The present embodiments relate to ensuring authenticity of at least one value of a device property.

Operating values of dynamic device properties play a major role in equipment monitoring. Currently, the operating values are often transmitted insecurely to an analysis unit. It cannot then be ensured that the operating values are received and processed unaltered in the analysis unit. However, if the data is transmitted to the analysis unit in encrypted form, the operating values cannot be immediately observed and evaluated, but are to first undergo time-consuming decryption.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a current method is improved.

A method of one or more of the present embodiments for providing authenticity of at least one value of a device property is provided. The device property is a characteristic of an item of equipment. In the method, at least one operating value of at least one dynamic device property is signed using a digital key. An operating-value-dependent digital signature is generated.

One or more of the present embodiments are based on the concept of being able to sign operating values of dynamic device properties that were hitherto stored and/or transmitted in an unprotected manner. This enables the authenticity and/or integrity of these operating values to be ensured. For example, it may be ensured that the operating values have not been tampered with. In other words, the signature may be used to ensure the authenticity and/or integrity of the at least one operating value. In the method, the operating values may be observed and evaluated immediately (e.g., in contrast to using encryption). This obviates the need for time-consuming decryption.

The device may be a unit that may be technically operated. The device may also be a group of units that may be technically operated, each unit of which is individually operable.

An operating value of a device property, hereinafter also referred to simply as an operating value, may be a dynamic value. The operating value may be dependent on a time (e.g., on an operating time of the device). The operating value may be ascertained (e.g., the operating value may be determined, measured, read out, read in, etc.). For example, the operating value may be an ascertained value of the device property (e.g., respective device property).

An operating-value-dependent digital signature, hereinafter also referred to simply as a signature, may be a digital signature that is dependent on the at least one operating value. The signature expediently ensures the authenticity of the operating value. The signature may also ensure the integrity of the operating value.

The signature may be updated if one value of the at least one operating value changes above a predefined threshold value. It may be regarded as a change of one value of the at least one operating value above a predefined threshold value if at least one operating value changes by more than the specified threshold value. For example, the signature may be updated by regenerating the signature. The signature may be updated by the signing of the most recently ascertained operating value of the device property (e.g., the respective device property).

The digital key may be a private key. The digital key may also be a secret key.

The at least one device property may include an operating time of the device. Accordingly, the operating value may be the value of the operating time. In addition, the predefined threshold value may be a predefined time duration (e.g., 1 h, 12 h, 24 h, etc.). For example, the signature may be updated if the value of the operating time changes above the predefined time duration (e.g., if the value of the operating time changes by more than the predefined time duration).

In addition, the at least one device property may be an error count of the device. A device error may be a device hardware error and/or a device software error. The operating value may be the error count value. In addition, the predefined threshold value may be a predefined number (e.g., 1).

The at least one device property may also include an error code of the device.

In addition, the at least one device property may include a number of restarts of the device. A device restart may be hardware restart of the device (e.g., if rotation of a rotational element of the device is restarted). A device restart may also be a software restart of the device.

In addition, the at least one device property may be a number of maintenance activities carried out on the device. Device maintenance may be hardware maintenance of the device and/or software maintenance of the device.

The at least one device property may include a measured value ascertained by the device and/or a drift of a measured value ascertained by the device. The measured value may be a value of a physical parameter and/or of a chemical parameter. The measured value may be, for example, a pressure, a temperature, a power consumption, or a similar value.

In an embodiment, one or more operating values that are dependent on an operating time of the device are exclusively used. In other words, one or more dynamic device properties may be exclusively used.

Static device properties with fixed values may, however, be used in addition to the dynamic device properties. Static device properties may be, for example, a serial number of the device, manufacturer information, a device designation, a device type specification, and/or a date of manufacture of the device.

In an embodiment, a certificate is generated from the at least one operating value and from the signature.

The certificate may be used for securely transmitting the at least one operating value to a receiver. In one embodiment, the certificate is used to ensure the authenticity and/or integrity of the at least one operating value.

The certificate may be updated if one value of the at least one operating values changes above a particular threshold value. For example, the certificate may be updated by being regenerated. In one embodiment, a most recently ascertained operating value of the device property (e.g., respective device property) is signed to update the certificate. A current signature may be generated. The current certificate may be generated from the most recently ascertained operating value or values and from the current signature.

The certificate may be transmitted from the device to a receiver. The receiver may authenticate itself to the device prior to transmission.

The certificate may also be checked. For example, the certificate may be checked by the receiver. The certificate may also be checked by a unit that is connected to the device. For example, when using a public key, it may be checked whether the signature matches the at least one operating value. The public key method may be used.

In this way, the authenticity and integrity of the at least one operating value may be ensured. For example, it may be ensured that the at least one operating value has not been tampered with.

The present embodiments further relate to a computer program including commands. When the computer program is executed on a computer, the commands cause that computer to carry out the above-described method and/or further developments thereof. For example, the commands may cause the computer to generate the above-described signature and/or to generate the above-described certificate, and if necessary, transmit the certificate to a receiver.

The present embodiments also relate to a computer-readable storage medium (e.g., a non-transitory computer-readable storage medium) containing commands. When these commands are executed by a computer, the commands cause that computer to carry out the above-described method. For example, the commands may cause the computer to generate the above-described signature and/or to generate the above-described certificate, and if necessary, transmit the certificate to a receiver. The commands may be the commands mentioned previously in connection with the computer program.

The present embodiments also relate to the use of a digital key to generate a signature from at least one operating value of at least one dynamic device property. The device property may logically be a characteristic of the device. In one embodiment, the signature is used to generate a certificate for a device.

The present embodiments also relate to an apparatus for ensuring the authenticity of at least one value of a device property. The device property is a characteristic of the device, and the device has at least one dynamic device property for which at least one operating value may be determined. According to the present embodiments, the apparatus includes a determination unit configured to determine the at least one operating value. The apparatus also includes a certification unit configured to sign the at least one operating value. An operating-value-dependent digital signature is generated.

The certification unit is configured to generate the certificate from the at least one operating value and from the signature.

In addition, the certification unit may be configured to update the certificate if one of the at least one operating values changes above a particular threshold value.

The apparatus may be used to carry out the above-described method and/or further developments thereof. For example, the apparatus may be used to generate the signature mentioned in connection with the method and/or the certificate mentioned in connection with the method, and if necessary, to transmit the certificate to a receiver.

The foregoing description of embodiments contains numerous features, some of which are grouped together above and below. These features may also be considered singly and amalgamated to create further useful combinations. For example, these features may in each case be combined individually and in any suitable combination with the method according to the present embodiments and the apparatus according to the present embodiments. Thus, method features may also be regarded as being concretely formulated as a property of the corresponding apparatus unit and vice versa.

Even if some terms are used in the singular or in conjunction with a numeral, the scope of the invention for these terms shall not be limited to the singular or the respective numeral.

The above-described characteristics, features, and advantages of this invention and the manner in which they are achieved will become clearer and more readily understandable in conjunction with the following description of the exemplary embodiment, which will be explained in more detail with reference to the drawings. The exemplary embodiments are used to explain the invention and do not limit the invention to the combination of features specified therein, nor with respect to functional features. Features of the exemplary embodiment that are suitable for this purpose may also be considered explicitly in isolation, removed from the exemplary embodiment, and/or combined with any of the other features.

DETAILED DESCRIPTION

Figure 1:
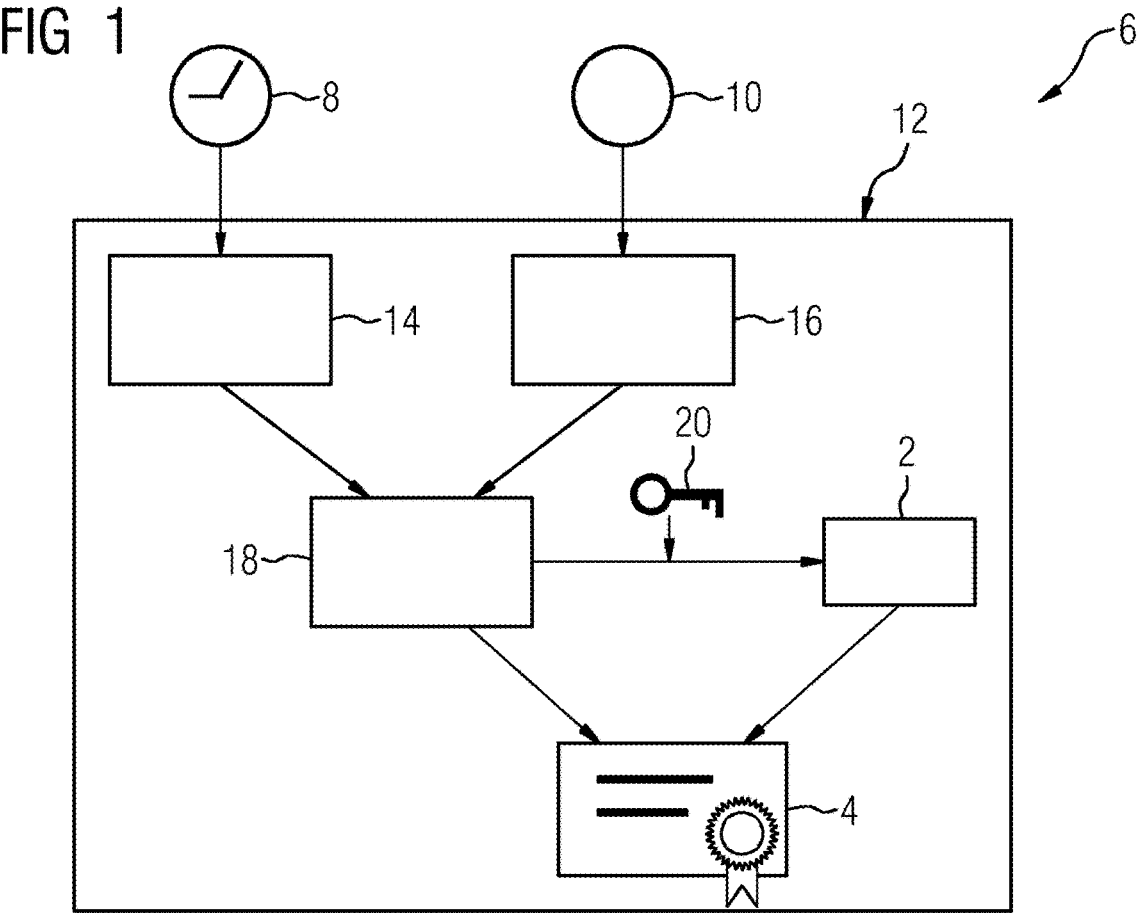
FIG. 1 shows an exemplary generation of a signature and an exemplary generation of a certificate.

FIG. 1 schematically illustrates how a signature 2 is generated. FIG. 1 also shows how a certificate 4 is generated. Both operations take place within a device 6.

The device 6 includes a plurality of determination units 8, 10. In FIG. 1, two determination units 8, 10 are shown by way of example. In principle, the device 6 may also have any other number of determination units. The device 6 also incorporates a certification unit 12. The plurality of determination units 8, 10 and the certification unit 12 may be formed by one or more processors.

A first operating value 14 of a first device property is ascertained using the first determination unit 8. In this exemplary embodiment, the first determination unit 8 is a timer. Also, in this example, the first operating value 14 is a value of an operating time. In other words, the first device property in this example is the operating time.

In addition, a second operating value 16 of a second device property is ascertained using the second determination unit 10. In this exemplary embodiment, the second determination unit 10 is an error counter. The second operating value 16 in this example is an error count value. In other words, the second device property is in this example the error count. Other operating values may also be determined additionally or alternatively. For example, an error number may be determined.

The operating values 14, 16 (e.g., all the operating values 14, 16 determined) may be transferred from the determination units 8, 10 to the certification unit 12. It is also possible for the certification unit 12 to read out the operating values 14, 16 from the determination units 8, 10.

The operating values 14, 16 (e.g., all the operating values 14, 16 determined) are concatenated to form a property vector 18 and then signed by a digital key 20. An operating-value-dependent digital signature 2 is generated. Both the concatenation and the signing take place using the certification unit 12. The digital key 20 is a secret, private key.

The certificate 4 is generated from the property vector 18, which includes the two operating values 14, 16, and from the signature 2. The certificate 4 is also generated using the certification unit 12.

The signature 2 and the certificate 4 are updated if one of the at least one operating values 14, 16 changes above a predefined threshold value. The updating may take place by regenerating both the signature 2 and the certificate 4.

For example, updating takes place if the operating time changes by more than a predefined period of time (e.g., by more than 24 h). Updating also takes place, for example, if the error count changes by more than a predefined numerical value (e.g., by more than 0.5).

The authenticity and integrity of the operating values 14, 16 may be ensured by the certificate 4 (e.g., by the operating-value-dependent signature 2). For example, it may be ensured that the operating values 14, 16 have not been tampered with.

Figure 2:
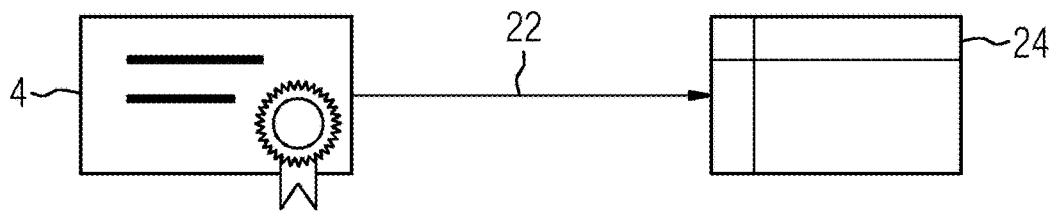
FIG. 2 shows an exemplary transmission of the certificate from FIG. 1 to a database of an operator of a device.
Figure 3:
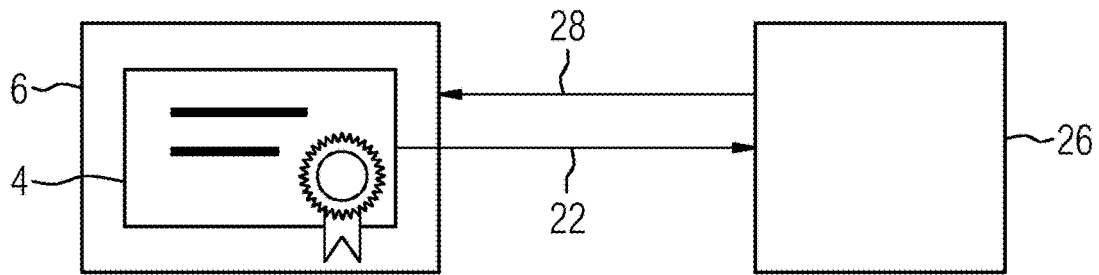
FIG. 3 shows an exemplary transmission of the certificate to a manufacturer of the device.

The certificate 4 may be transmitted to a receiver 24, 26 (cf., FIG. 2 and FIG. 3).

FIG. 2 shows the transmission 22 of the certificate 4 to a database 24 of an operator of the device 6. The transmission 22 is indicated by an arrow 22.

In other words, the database 24 of the operator is the receiver of the certificate 4.

The receiver (e.g., the database 24 of the operator) may first check whether the signature 2 of the certificate 4 matches the operating values 14, 16 included by the property vector 18. The checking takes place using a public key. If the signature 2 of the certificate 4 matches the operating values 14, 16, the authenticity and integrity of the operating values 14, 16 is verified, and the operating values 14, 16 may then be written to the database 24. In this way, the database 24 is kept up to date.

Both the device 6 and operating values 14, 16 for the device 6 are therefore recorded in the database 24. The progression or development of the operating values 14, 16 may also be tracked using the database 24. This data may be used as a basis for predicting when a critical state of the device 6 or, more specifically, components of the device 6 will be reached.

In this way, the database 24 may be used for inventory, for modernization planning, and/or for maintenance planning.

FIG. 3 shows the transmission 22 of the certificate 4 to a manufacturer 26 of the device 6.

A communication channel is to first be set up between the device 6 and the manufacturer 26. A communication channel may be provided, for example, via a plant bus and/or a control system to which the device is connected. The device may also establish a connection to the manufacturer 26 via a mobile communications network (e.g., via the Global System for Mobile Communications (GSM)) at a predetermined point in time. It is also possible for a computer of a manufacturer to be connected to the device 6 for diagnostic and/or maintenance purposes. The certificate 4 may then be transmitted to the computer, which forwards the certificate 4 (e.g., possibly later) to the manufacturer 26. It is also possible for the device 6 to be handed over or sent directly to the manufacturer 2 (e.g., for repair purposes) so that the manufacturer may download the certificate 4 from the device 6 directly.

The manufacturer 26 may first authenticate itself to the device 6. The authentication is indicated in FIG. 3 by an arrow 28 from the manufacturer 26 to the device 6. This provides that the manufacturer is authorized to receive the certificate 4. The device 6 then sends the certificate 4 to the manufacturer 26. In other words, the manufacturer 26 is the receiver of the certificate 4.

The receiver (e.g., the manufacturer 26) may first check whether the signature 2 of the certificate 4 matches the operating values 14, 16 included by the property vector 18. In other words, the certificate 4 is used to check whether the operating values 14, 16 transmitted to the manufacturer 26 have been tampered with. The check is performed using a public key. If the signature 2 of the certificate 4 matches the operating values 14, 16, the authenticity and integrity of the operating values 14, 16 are verified. The operating values 14, 16 are then transmitted (e.g., to the analysis unit of the manufacturer 26).

Using the analysis unit, for example, the manufacturer 26 may use the transmitted operating values 14, 16 to identify frequent errors on the device 6 or device type in order to make the operator of the device 6 aware of possible updates and/or, by analysis of at least one of the operating values 14, 16, to make the operator aware of necessary maintenance and/or repairs.

Although the invention has been illustrated and described in detail by the exemplary embodiments, the invention is, however, not limited by the examples disclosed. Other variations will be apparent to persons skilled in the art without departing from the scope of protection sought for the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for ensuring authenticity of at least one value of a device property, wherein the device property is a characteristic of a device, the method comprising:
   signing at least one operating value of at least one dynamic device property using a digital key, wherein an operating-value-dependent digital signature is generated;
   generating a certificate from the at least one operating value and from the operating-value-dependent digital signature; and
   updating the certificate when one of the at least one operating values changes above a particular threshold value.

2. The method of claim 1, further comprising updating the operating-value-dependent digital signature when one of the at least one operating values changes above a predefined threshold value.

3. The method of claim 1, wherein the digital key is a private key.

4. The method of claim 1, wherein the at least one dynamic device property comprises an operating time of the device.

5. The method of claim 1, wherein the at least one dynamic device property comprises an error count of the device, an error code of the device, a number of restarts of the device, a number of maintenance activities carried out on the device, a measured value ascertained by the device, a drift of a measured value ascertained by the device, or any combination thereof.

6. The method of claim 1, wherein one or more operating values of the at least one operating value are dependent on an operating time of the device.

7. The method of claim 1, further comprising transmitting the certificate from the device to a receiver.

8. The method of claim 7, further comprising authenticating, by the receiver, the receiver to the device prior to the transmitting.

9. The method of claim 1, further comprising:
checking the certificate; and
checking whether the operating-value-dependent digital signature matches the at least one operating value using a public key.

10. In a non-transitory computer-readable storage medium that stores instructions executable by a computer to ensure authenticity of at least one value of a device property, wherein the device property is a characteristic of a device, the instructions comprising:
signing at least one operating value of at least one dynamic device property using a digital key, wherein an operating-value-dependent digital signature is generated;
generating a certificate from the at least one operating value and from the operating-value-dependent digital signature; and
updating the certificate when one of the at least one operating values changes above a particular threshold value.

11. A method comprising:
generating a signature from at least one operating value of at least one dynamic device property of a device using a digital key;
generating a certificate for the device from the at least one operating value and from the signature using the signature; and
updating the certificate when one operating value of the at least one operating value changes above a particular threshold value.

12. An apparatus for ensuring authenticity of at least one value of a device property, wherein the device property is a characteristic of a device, and the device has at least one dynamic device property for which at least one operating value is determinable, comprising:
a determination unit configured to determine the at least one operating value; and
a certification unit configured to:
sign the at least one operating value, wherein an operating-value-dependent digital signature is generated;
generate a certificate from the at least one operating value and from the signature; and
update the certificate when one operating value of the at least one operating value changes above a particular threshold value.

* * * * *